T. F. LINEGAR & H. M. STORMS.
ROTARY POWER WASHER.
APPLICATION FILED APR. 2, 1909.
978,461.
Patented Dec. 13, 1910.
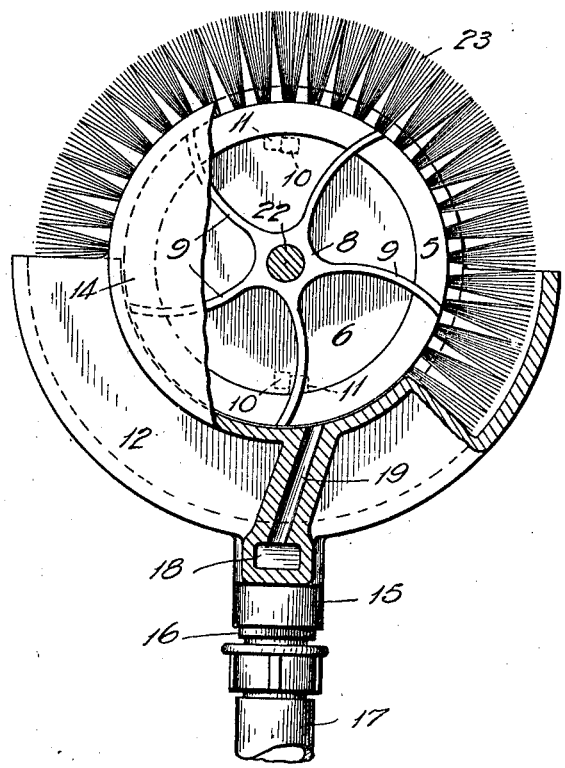
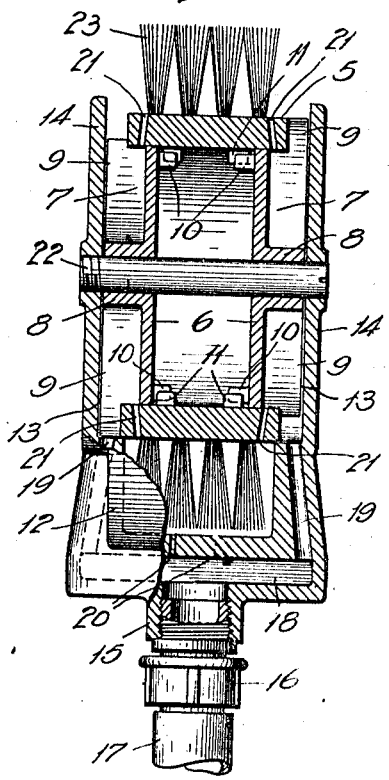
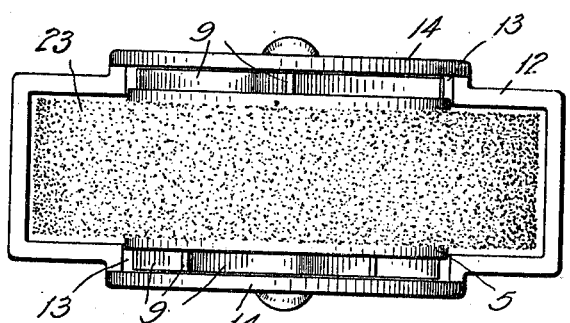
WITNESSES:
INVENTORS:
Thomas F. Linegar
and Henry M. Storms
by Pierre Barnes
ATTORNEY.

UNITED STATES PATENT OFFICE.

THOMAS F. LINEGAR AND HENRY M. STORMS, OF SEATTLE, WASHINGTON.

ROTARY POWER-WASHER.

978,461.  Specification of Letters Patent.  Patented Dec. 13, 1910.

Application filed April 2, 1909. Serial No. 487,407.

*To all whom it may concern:*

Be it known that we, THOMAS F. LINEGAR and HENRY M. STORMS, citizens of the United States, residing at Seattle, in the county of King and State of Washington, have invented certain new and useful Improvements in Rotary Power-Washers, of which the following is a specification.

The object of this invention is to provide a new and improved scrubbing apparatus which is especially designed for use in cleaning automobiles, and other vehicles, though it may advantageously be employed for analogous operations in other work.

The invention, generally stated, may be said to consist of a brush mounted for rotation in a casing which is arranged to be attached by a flexible hose with a source of water supply which affords power for operating the brush and also to furnish water for washing purposes.

The invention also consists in the novel construction, adaptation and combination of parts, as will be hereinafter described with reference to the accompanying drawings, wherein—

Figure 1 is a side elevational view of an embodiment of our invention with the containing case partly broken away. Fig. 2 is a vertical cross sectional view of the same. Fig. 3 is a plan view. Fig. 4 is a side elevation of the runner removed from the casing and illustrated with a modified form of brush.

The apparatus is provided with a rotary brush having an annular shaped body 5 which is mounted upon disk webs 6 which are respectively inserted within the ends of said body so as to afford a recess 7 at each end of the latter. Formed centrally of each of said webs and projecting from the side face is a boss 8 and extending radially therefrom is a series of longitudinally curved vanes or blades 9 which overlie the respective sides of the body and terminate in proximity to the periphery of the same. The disk members 6 are removably fitted within the brush-body and are rotatably engaged therewith by the provision of lugs 10 and 11 upon the disks and brush-body, respectively.

A suitable containing casing is provided for the brush and may be composed of a semicircular central portion 12 which is chambered to accommodate the brush and is offset at the sides to provide correspondingly shaped wing compartments 13 for containing the runner vanes 9. The side walls 14 of said wing compartments are desirably made of a substantially circular configuration with a diameter approximately that of the vanes to afford shroud plates for preventing the water being scattered.

Protruding from the peripheral wall of the casing and diametrically opposite to the aforesaid opening is a tubular extension 15 which is screw-threaded to receive the coupling 16 of a flexible hose 17 for making connection with a source of water supply. Within the casing said extension communicates by a transversely arranged conduit 18 with two converging passage ways 19, Fig. 2, which are disposed to direct the power medium to impinge the vanes principally within the respective recesses for rotating the brush. Communication is also had by relatively small holes 20 between the conduit 18 and the interior of the brush-chamber to furnish a supply of water directly to the brush to facilitate the scrubbing operations. Extending from the spaces between the vanes and through the body to the outer perimeter of the same is a series of holes 21, Fig. 2, for affording means for the escape of such water as may be entrained within the recess compartments to be delivered to the brush proper, and acting supplementary to the offices of the holes 20.

The brush is mounted, for rotation on an axle 22 extending through the web bosses 8 and is supported at its ends by the casing walls 14. The brush may be of any type suitable to the work which is to be done as, for example, bristle-brushes, such as indicated by 23 in Figs. 1 to 3, inclusive, are well adapted to scrubbing vehicles; while for other services the brush may be provided with a noduled periphery 24, see Fig. 4, which may be formed of rubber.

The operation of the invention is as follows: When water under pressure is admitted into the casing from the hose 17 it will be caused to flow through the conduit 18 into the passages 19 whereby it is directed to strike the vanes 9 to effect the rotation of the brush. If the brush when thus actuated is brought into contact with the surface of an object to be scrubbed it is evident that it will perform such action most efficiently. This scrubbing action is more effectively accomplished with a supply of water delivered through the holes 20 leading from the conduit 18 and also through the holes 21. The apparatus as a whole is manipulated in the hands of an operator when grasping the casing extension 15, which may be extended any convenient distance for this purpose, and is operative when held at any inclination as best suited to the work.

Having described our invention, what we claim, is—

1. A rotary washer, comprising, in combination, a partially inclosed casing having a transverse chambered base, a brush having a cylindrical body and adapted to rotate in said casing, ends in said cylindrical body having outwardly projecting bosses, a shaft extending through said bosses and into the sides of said casing, and radial curved vanes extending from said bosses on the outer face of each of said ends, said base having conduits at each end whereby water may be directed against said vanes and the body of said brush having conduits whereby water may be directed from said vanes to the bristles of said cylindrical brush.

2. A rotary washer, comprising, in combination, a partially inclosed casing having a transverse chambered base, a brush having a cylindrical body and adapted to rotate in said casing with its bristles adjacent said chambered base and radial vanes carried by said body and extending partially within said cylindrical body, said chambered base having conduits at its ends for directing water against said vanes, and conduits for supplying water to said brush, and said cylindrical body of the brush having conduits for supplying the water directly from said vanes to the outer side of said cylindrical body.

3. A rotary washer, comprising, in combination, a partially inclosed casing, having a transverse chambered base, a brush having a cylindrical body and adapted to rotate in said base, end members inserted in the ends of said cylindrical body to provide an overhanging margin of the latter on each end, and vanes extending from each of said end members and underlying said margin, said chambered base being formed to conduct water to said vanes and said overhanging margins being formed to direct water to the outer periphery of said body.

4. A rotary washer, comprising, in combination, a casing having a chambered base, a shaft mounted in said casing, a brush rotatably mounted on said shaft, said brush comprising an annular body, a plurality of lugs formed on the interior of said body, end members mounted on said shaft and slidably mounted on said annular body, the inward movement of said end members being prevented by said lugs, lugs formed on said end members to engage said lugs in said body to prevent relative rotary movement of the end members and the body, vanes on said end members extending therefrom to the sides of the casing, and means to conduct water from said chambered base to said vanes.

5. A rotary washer, comprising, in combination, a casing having a chambered base, a shaft mounted in said casing, a brush rotatably mounted on said shaft, said brush comprising an annular body, end members inserted into the ends of said annular body and rotatably mounted on said shaft, coöperating means carried by said body and said end members to prevent relative rotation thereof, vanes carried by said end members and extending therefrom to the sides of the casing, and means to conduct water from the chambered base to said vanes.

THOMAS F. LINEGAR.
HENRY M. STORMS.

Witnesses:
PIERRE BARNES,
H. BARNES.